(12) United States Patent
Hsu

(10) Patent No.: US 6,408,606 B1
(45) Date of Patent: Jun. 25, 2002

(54) RAKE HAVING DETACHABLE BODY AND HANDLE

(76) Inventor: Shih Hao Hsu, No. 426, Dou Yuan East Road, Bi Tou Hsiang, Chang Hua Hsien (TW), 523

(*) Notice: Subject to any disclaimer, the term of this patent is extended or adjusted under 35 U.S.C. 154(b) by 0 days.

(21) Appl. No.: 09/765,708

(22) Filed: Jan. 22, 2001

(51) Int. Cl.⁷ .............................................. A01D 11/00
(52) U.S. Cl. .................................................. 56/400.04
(58) Field of Search .................... 56/400.01, 400.04, 56/400.17, 400.18, 400.19, 400.2; 172/375, 378; 294/51, 52

(56) References Cited

U.S. PATENT DOCUMENTS

| | | | |
|---|---|---|---|
| 4,786,095 A | * 11/1988 | Dumont ........................ 294/51 |
| 4,866,922 A | * 9/1989 | Clark ........................ 56/400.04 |
| 5,168,693 A | * 12/1992 | Ingvardsen ............... 56/400.04 |
| 5,553,447 A | 9/1996 | Hsu ........................ 56/400.18 |

* cited by examiner

Primary Examiner—Robert E. Pezzuto
(74) Attorney, Agent, or Firm—Charles E. Baxley

(57) ABSTRACT

A rake includes a detachable handle, and includes a number of teeth formed in the bottom for working as a rake, and includes a recess formed by a peripheral wall for working as a shovel, and includes one or more hand grips for holding the rake after the handle is disengaged from the rake. The rake includes a cylindrical member for receiving the handle. A lever has a cam pivotally secured to the rake for detachably securing the handle to the rake. The rake includes a channel for slidably receiving a shoe. The shoe is engaged between the cam of the lever and the handle.

6 Claims, 5 Drawing Sheets

RAKE HAVING DETACHABLE BODY AND HANDLE

BACKGROUND OF THE INVENTION

1. Field of the Invention

The present invention relates to a rake, and more particularly to a rake including a rake body that may be detached from the handle and that may be used without the handle.

2. Description of the Prior Art

The applicant has developed various kinds of typical rakes including U.S. Pat. No. 5,553,447 to Hsu. The typical rakes includes a number of tines secured to a handle. The tines may not be detached from the handle. In addition, when the tines are disengaged from the handle, the tines may not be used as a rake for gathering the garbages or tree leaves. Furthermore, the typical rakes may not be used as a shovel for shoveling the snow or the like.

The present invention has arisen to mitigate and/or obviate the afore-described disadvantages of the conventional rakes.

SUMMARY OF THE INVENTION

The primary objective of the present invention is to provide a rake including a rake body that may be detached or disengaged from the handle and that may also be used as a rake after being disengaged from the handle.

The other objective of the present invention is to provide a rake including a structure for allowing the rake to be used as a rake and a shovel for shoveling the snow or the like.

In accordance with one aspect of the invention, there is provided a rake comprising a rake body, a handle, and means for detachably securing the rake body to the handle. The rake may be used as a rake and a shovel when the handle is attached to or disengaged from the rake body.

The rake body includes a bottom portion having a plurality of teeth formed therein for working as a rake, and includes a recess formed therein for working as a shovel, and includes two sides and an upper portion having a peripheral wall extended therefrom for defining the recess of the rake body.

The rake body includes at least one hand grip provided therein for holding and operating the rake body after the rake body is disengaged from the handle, and includes at least one cavity formed therein for receiving the hand grip.

The rake body includes a cylindrical member having a bore formed therein for receiving the handle. The cylindrical member includes at least one cut-off opening formed therein for viewing an engagement of the handle into the cylindrical member.

The detachably securing means includes a lever having a cam pivotally secured to the rake body with a pivot shaft, for clamping and securing the handle to the rake body by rotating the lever relative to the rake body.

The rake body includes a pair of ears extended therefrom, the pivot shaft is engaged through the ears for pivotally securing the cam of the lever to the rake body.

The rake body includes a channel formed therein, the detachably securing means includes a shoe slidably received in the channel and engaged between the cam of the lever and the handle for being forced to engage with the handle by the cam of the lever.

The shoe includes a pair of flaps extended therefrom and each having an oblong hole formed therein for slidably receiving the pivot shaft and limiting a relative movement between the shoe and the rake body.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
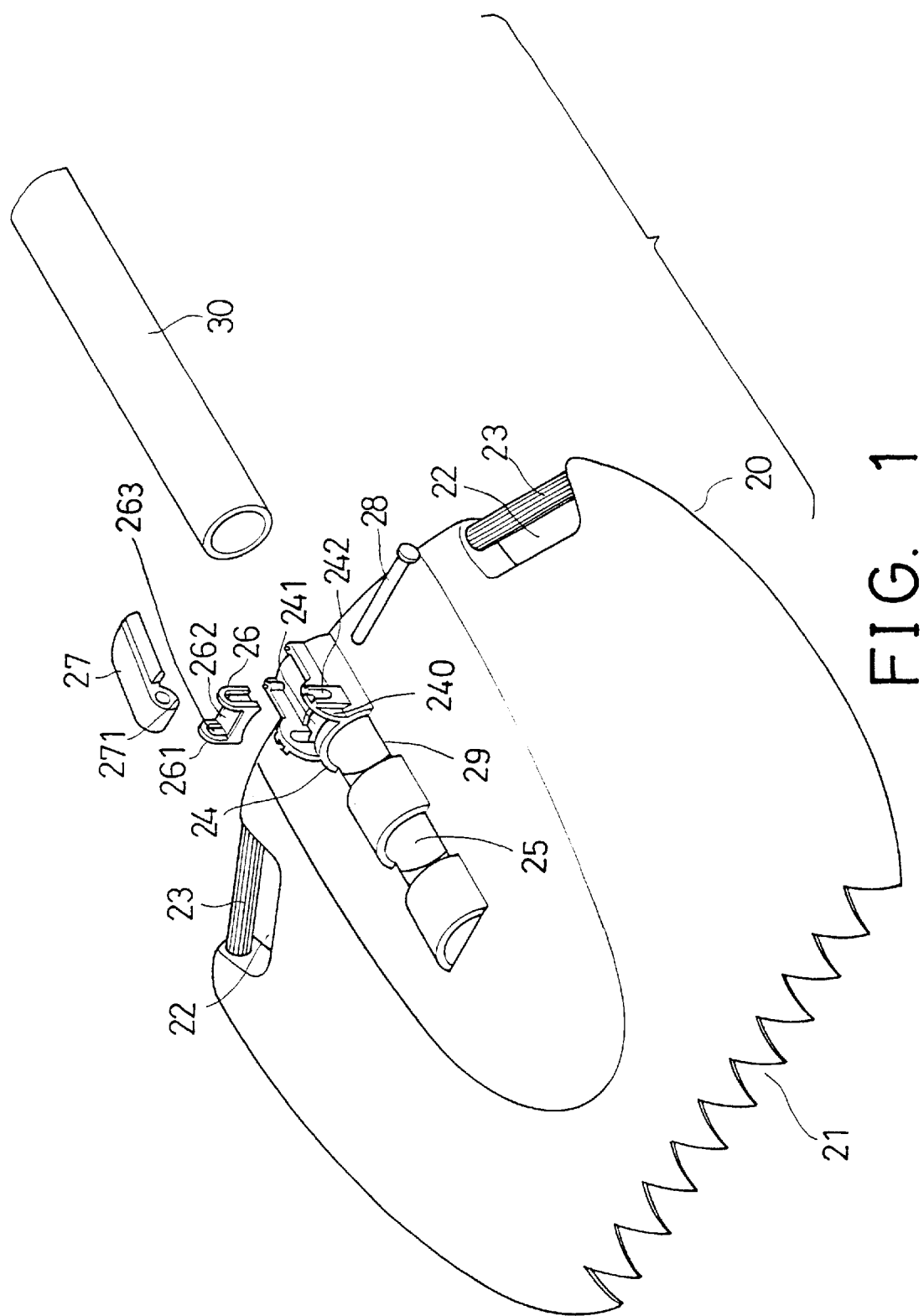
FIG. 1 is an exploded view of a rake in accordance with the present invention.

Referring to the drawings, and initially to FIGS. 1–4, a rake in accordance with the present invention comprises a rake body 20 including a lower or bottom portion having a number of teeth 21 formed therein for raking purposes, and including a peripheral wall 31 (FIG. 7) extended from the sides and the upper portion thereof for defining a recess 33 therein and for forming a shovel head and for shoveling purposes. The rake body 20 includes one or more cavities 22 formed in the upper portion thereof, and one or more hand grips 23 secured in the cavities 22 respectively, for allowing the rake body 20 to be held and operated by the users.

The rake body 20 includes a middle portion having a cylindrical member 24 formed and provided therein and having a bore 25 formed in the cylindrical member 24 for receiving one end of a handle 30. The cylindrical member 24 includes one or more cut-off openings 29 formed therein for viewing the engagement of the handle 30 within the cylindrical member 24. The cylindrical member 24 includes a pair of ears 240 extended therefrom and each having an orifice 242 formed therein, and includes a channel 241 formed therein and formed between the ears 240.

A shoe 26 is preferably made of rubber or plastic materials and is slidably engaged in the channel 241 of the cylindrical member 24. The shoe 26 includes a curved upper surface 262 formed therein, and includes a pair of flaps 261 extended therefrom and each having an oblong hole 263 formed therein. A lever 27 includes a cam 271 received between the flaps 261 of the shoe 26 and engaged with the curved upper surface 262 of the shoe 26. A shaft 28 is engaged through the orifices 242 of the ears 240 and the oblong holes 263 of the flaps 261 of the shoe 26 and engaged through the cam 271 for pivotally securing the cam 271 of the lever 27 to the cylindrical member 24. The sliding engagement of the shaft 28 in the oblong holes 263 of the flaps 261 may limit the relative movement between the shoe 26 and the rake body 20 and may prevent the shoe 26 from being disengaged from the rake body 20.

Figure 3:
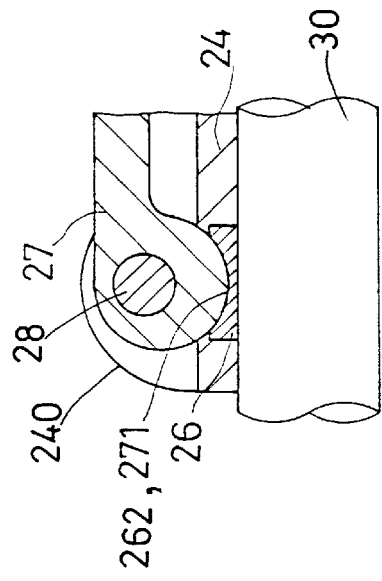
FIG. 3 is an enlarged partial cross sectional view of the rake.
Figure 2:
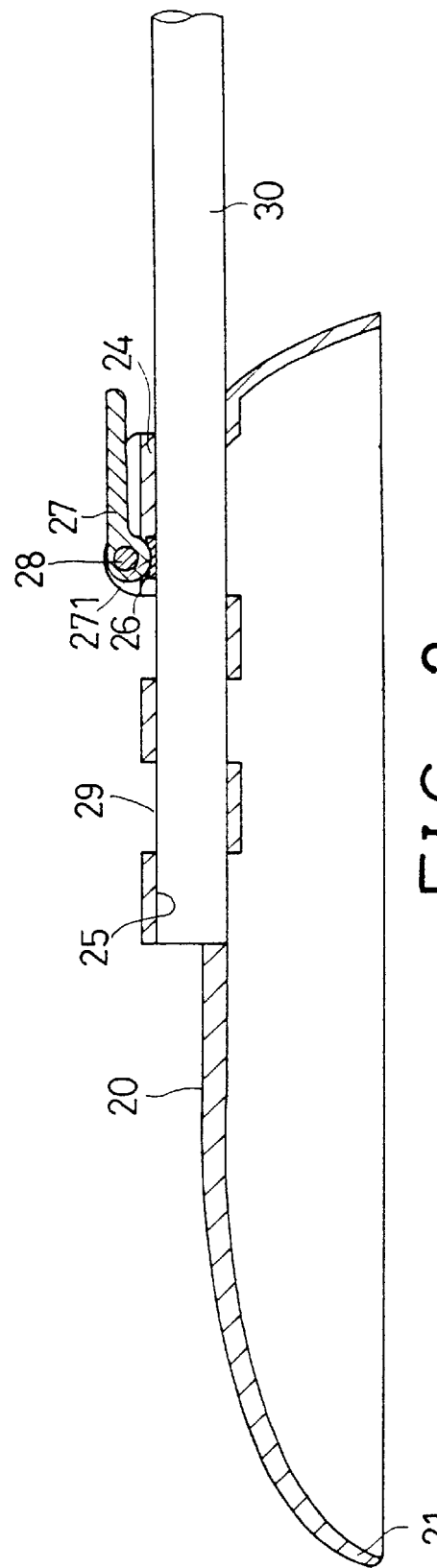
FIG. 2 is a cross sectional view of the rake.
Figure 4:
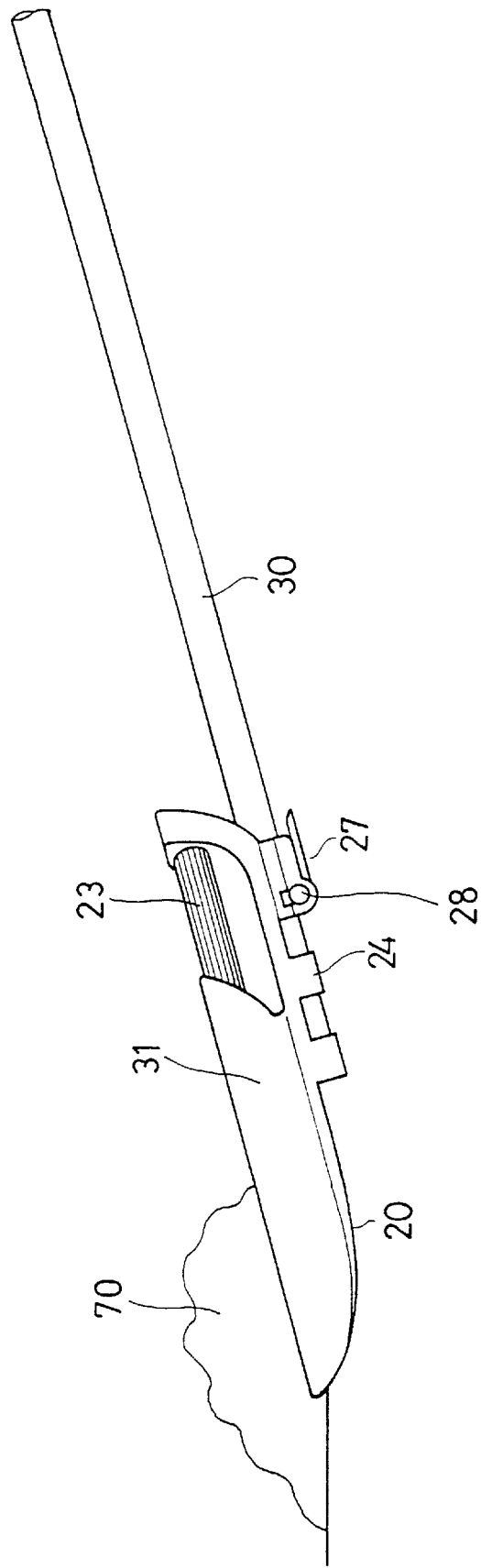
FIGS. 4, 5 are plane views illustrating the operation of the rake.
Figure 5:
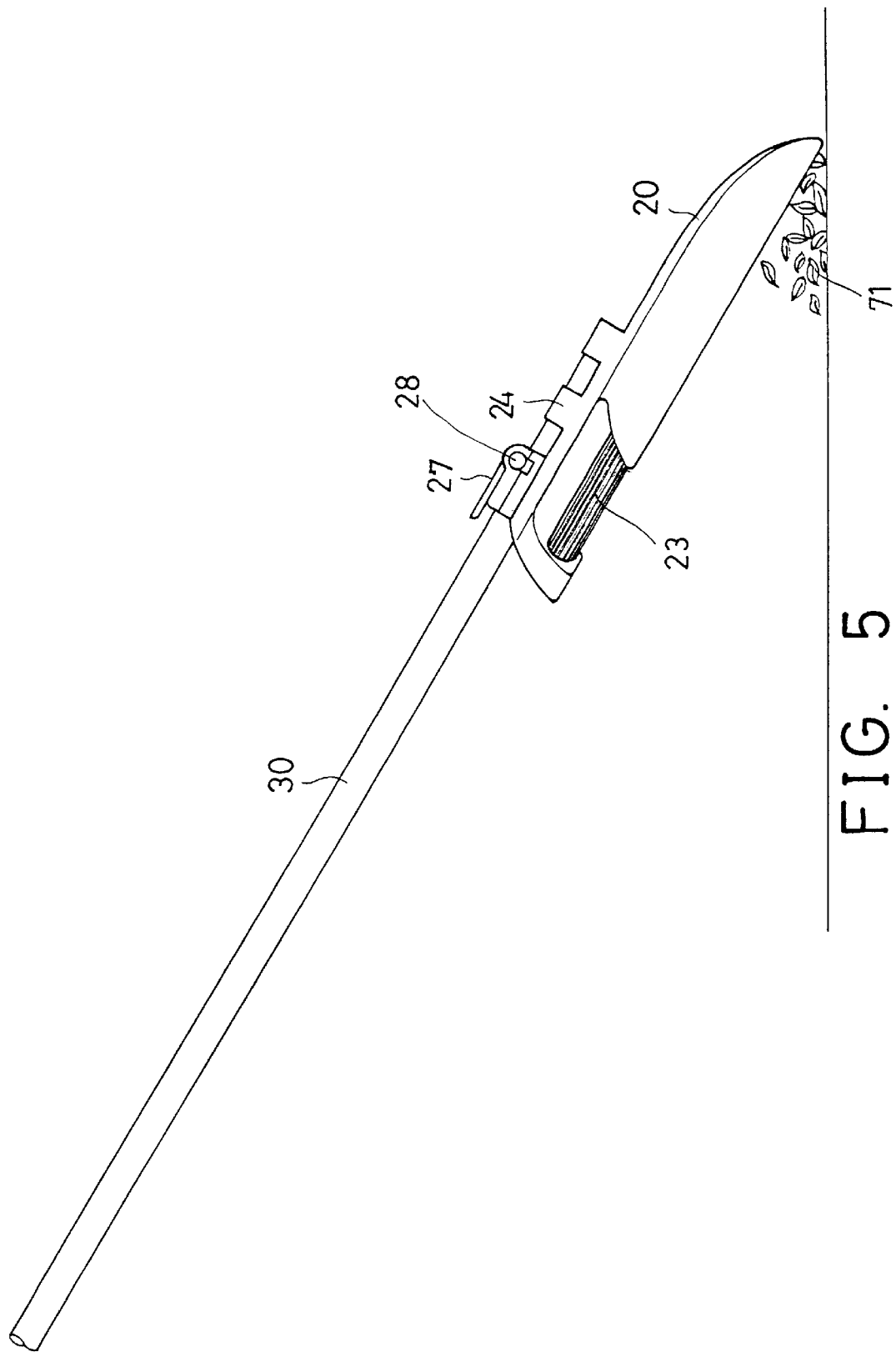
Figure 7:
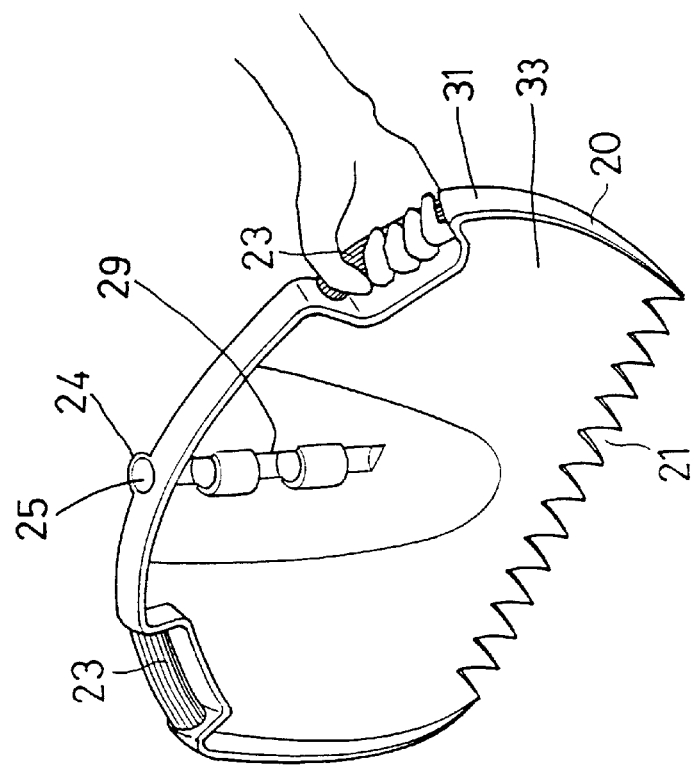
FIG. 7 is a rear perspective view of the rake body.
Figure 6:
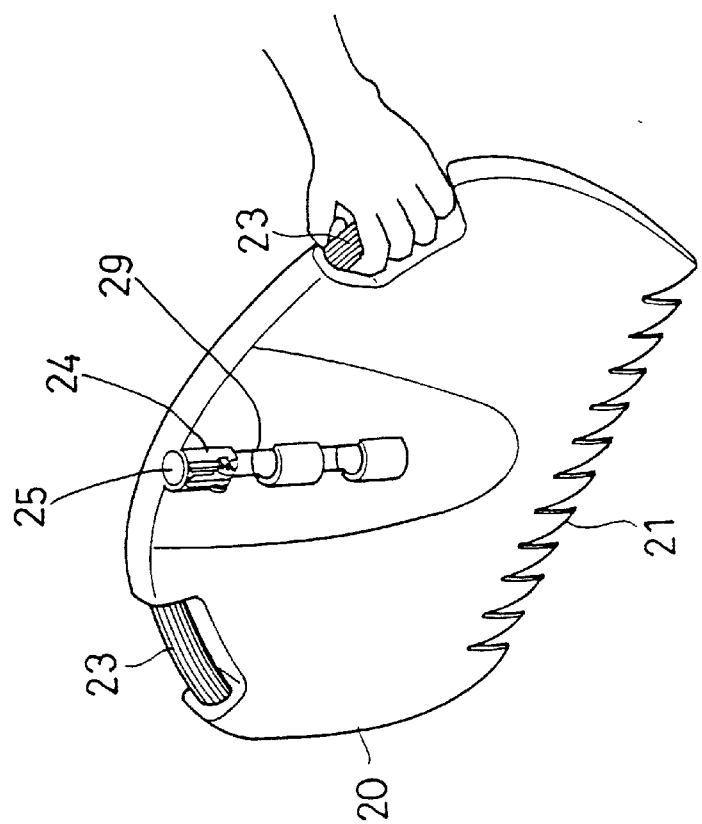
FIG. 6 is a front perspective view of the rake body.

In operation, as shown in FIGS. 2, 3, the shoe 26 may be forced to engage with the handle 30 by the cam 271 of the lever 27, so as to quickly and detachably secure and clamp the handle 30 to the rake body 20. The sliding engagement of the shaft 28 in the oblong holes 263 of the flaps 261 allows the shoe 26 to be forced to move relative to the cylindrical member 24 and to engage with the handle 30. The rake body 20 may be used for shoveling the snow 70 or the like (FIG. 4), and may be used to rake the tree leaves 71 or the like (FIG. 5). As shown in FIGS. 6 and 7, the rake body 20 may be disengaged from the handle 30 by rotating the lever 27 away from the handle 30, and may be held and operated by the users to work as the rake and as the shovel.

Accordingly, the rake in accordance with the present invention includes a rake body that may be detached or disengaged from the handle and that may also be used as a rake after being disengaged from the handle. The rake may be used as a rake and a shovel for shoveling the snow or the like.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A rake comprising:

a rake body including at least one hand grip provided therein for holding and operating said rake body, said rake body including a cylindrical member spaced from said hand grip and having a bore formed therein, a handle including a first end engaged into said bore of said cylindrical member, and means for detachably securing said rake body to said handle, said detachably securing means including a lever having a cam pivotally secured to said rake body with a pivot shaft, for clamping and securing said handle to said rake body by rotating said lever relative to said rake body.

2. The rake according to claim 1, wherein said rake body includes a channel formed therein, said detachably securing means includes a shoe slidably received in said channel and engaged between said cam of said lever and said handle for being forced to engage with said handle by said cam of said lever.

3. The rake according to claim 2, wherein said shoe includes a pair of flaps extended therefrom and each having an oblong hole formed therein for slidably receiving said pivot shaft and limiting a relative movement between said shoe and said rake body.

4. The rake according to claim 1, wherein said rake body includes a plurality of teeth formed therein for working as a rake, and includes two sides and an upper portion having a peripheral wall extended therefrom for forming a recess therein and for working as a shovel.

5. The rake according to claim 1, wherein said rake body includes at least one cavity formed therein for receiving said at least one hand grip.

6. The rake according to claim 1, wherein said cylindrical member includes at least one cut-off opening formed therein for viewing an engagement of said handle into said cylindrical member.

* * * * *